US008656166B2

(12) United States Patent
Jacobs (10) Patent No.: US 8,656,166 B2
(45) Date of Patent: Feb. 18, 2014

(54) STORAGE AND AUTHENTICATION OF DATA TRANSACTIONS (75) Inventor: Michael Jacobs, Abercarn (GB)

(73) Assignee: The Ascent Group Ltd., Monmouth (GB)

( * ) Notice: Subject to any disclaimer, the term of this patent is extended or adjusted under 35 U.S.C. 154(b) by 0 days.

(21) Appl. No.: 13/494,272

(22) Filed: Jun. 12, 2012

(65) Prior Publication Data
US 2012/0260098 A1 Oct. 11, 2012

Related U.S. Application Data (63) Continuation of application No. 10/519,827, filed as application No. PCT/GB03/02623 on Jun. 19, 2003, now Pat. No. 8,200,760.

(30) Foreign Application Priority Data

Jul. 2, 2002 (GB) .................................. 0215334.4

(51) Int. Cl.
H04L 9/32 (2006.01)
(52) U.S. Cl.
USPC .................. 713/169; 726/2; 726/16; 380/37; 380/45; 380/282; 380/285; 380/30; 713/161; 713/170; 713/176; 713/168; 713/171; 709/201; 709/206; 705/64; 705/71; 705/75; 707/695; 707/703
(58) Field of Classification Search
USPC .................................................. 713/171, 176
See application file for complete search history.

(56) References Cited

U.S. PATENT DOCUMENTS

| 5,001,752 | A | * | 3/1991 | Fischer ......................... 713/178 |
| 5,643,086 | A | | 7/1997 | Alcorn et al. |
| 5,781,629 | A | | 7/1998 | Haber et al. |
| 6,118,874 | A | | 9/2000 | Okamoto et al. |
| 6,144,739 | A | | 11/2000 | Witt et al. |
| 6,584,564 | B2 | | 6/2003 | Olkin et al. |

(Continued)

FOREIGN PATENT DOCUMENTS

| EP | 0281225 | 9/1988 |
| EP | 0926611 | 6/1999 |

(Continued)

OTHER PUBLICATIONS

"One-Way Hash Functions"; Schneier, Bruce, Dr. Dobb's Journal, vol. 16, No. 9, pp. 148-151; Sep. 1, 1991.

(Continued)

Primary Examiner — Nathan Flynn
Assistant Examiner — Bryan Wright
(74) Attorney, Agent, or Firm — Gordon & Jacobson, PC (57) ABSTRACT Data is transmitted between a first user and a second user via an information technology communications network, in a method comprising the steps of:
generating a first hash value for a selected one of the data items;
digitally signing and encrypting the first hash value with a secret identifier associated with the first user;
transmitting to a second user the encrypted first hash value;
receiving and storing the transmitted encrypted first hash value for audit purposes and generating a second hash value for the received encrypted first hash value;
encrypting the second hash value with a private identifier associated with a second user and a public identifier associated with the first user; and
returning the encrypted second hash value to the first user.

7 Claims, 9 Drawing Sheets

(56) References Cited

U.S. PATENT DOCUMENTS

| | | | |
|---|---|---|---|
| 6,928,442 | B2 | 8/2005 | Farber et al. |
| 7,113,594 | B2 | 9/2006 | Boneh et al. |
| 8,200,760 | B2 * | 6/2012 | Jacobs .......................... 709/206 |
| 2001/0032088 | A1 | 10/2001 | Utsumi et al. |
| 2002/0004902 | A1 | 1/2002 | Toh et al. |
| 2002/0044662 | A1 * | 4/2002 | Sowler .......................... 380/277 |
| 2002/0104026 | A1 | 8/2002 | Barra et al. |
| 2003/0026433 | A1 * | 2/2003 | Matt .............................. 380/278 |
| 2003/0084298 | A1 * | 5/2003 | Messerges et al. ........... 713/176 |

FOREIGN PATENT DOCUMENTS

| | | |
|---|---|---|
| EP | 1056010 | 11/2000 |
| WO | WO91/19614 | 12/1991 |
| WO | WO95/09947 | 4/1995 |
| WO | WO00/23954 | 4/2000 |
| WO | WO01/50230 | 7/2001 |
| WO | WO02/48843 | 6/2002 |

OTHER PUBLICATIONS

"Digital Signatures"; Schneier, Bruce, Byte, vol. 18, No. 12, pp. 309-312; Nov. 1, 1993.

"Mining for Fraud"; Weatherford, Margaret Intelligent Systems, IEEE, Published Jul.-Aug. 2002.

"Mining for Fraud"; Weatherford, Margaret, Intelligent Systems, IEEE, Published Jul./Aug. 2002, vol. 17, Issue 4 (pp. 4-6).

* cited by examiner

STORAGE AND AUTHENTICATION OF DATA TRANSACTIONS

CROSS-REFERENCE TO RELATED APPLICATIONS

This is a continuation of U.S. application Ser. No. 10/519,827 filed 21 Dec. 2005, now U.S. Pat. No. 8,200,760, which is itself the US national phase of PCT application GB2003//002623 dated 19 Jun. 2003, which claims priority from GB0215334.4 dated 2 Jul. 2002, all of which are incorporated herein by reference in their entireties.

BACKGROUND OF THE INVENTION

1. Field of the Invention

The present invention relates to secure storage and positive authentication of data communications and transactions, particularly those taking place between parties across an information technology communications network, such as the Internet.

2. State of the Art

There are many circumstances in which it may be required to generate and store securely an audit trail of data transactions taking place over a period of time within, for example, an organisation and/or between such an organisation and other parties. Such an audit trail is only really useful if its accuracy can be verified/authenticated at a later date and, although some prior art arrangements exist which attempt to achieve this, they are not able to provide sufficient verification/authentication for some purposes. With such prior art arrangements, there is always an element of doubt because undetected compromise of stored data is still possible.

Further, as remote communications and transactions between parties across an information technology communications network increase, there is an increasing need to provide some form of proof of receipt by the intended recipient of such communications. Prior art protocols exist which enable the sender of a communication, such as an e-mail message, to determine that the communication has been delivered to a specified address and even that the message has been accessed or "read". However, such determination does not prove that the communication has necessarily been received by the correct recipient, nor does it provide any safeguard to enable any compromise of the communication or the intended communication path to be detected.

Still further, it is highly desirable, and in some circumstances essential, for a party to reliably authenticate a party with whom they wish to communicate and also to detect, substantially immediately, the compromise of a user identifier and to prevent any further transactions using that user identifier. Current arrangements rely on the valid user of an identifier to determine that the identifier has been compromised and inform a relevant monitoring body accordingly, so that the identifier can be cancelled and further transactions using that identifier prevented, which can sometimes not occur until many weeks after the compromise has taken place, during which time many unauthorised transactions using the compromised identifier may have been performed.

OBJECTS OF THE INVENTION

It is an object of the invention to provide methods and arrangements which enable a party to reliably authenticate a party with whom they wish to communicate.

It is a further object of the invention to provide methods and arrangements to detect, substantially immediately, the compromise of a user identifier and to prevent any further transactions using that user identifier.

SUMMARY OF THE INVENTION

In accordance with a first aspect of the present invention, there is provided apparatus for storage of data, comprising means for storing copies of a plurality of data items, means for generating at the end of a predetermined period of time, a data file comprising hash values of each data item created and/or stored during that time, means for generating a single hash value of said data file, and means for transmitting single hash value to a remote location for storage and/or publication thereof (or of data representative thereof).

In one embodiment of the first aspect of the present invention, a hash value is created locally for each file within a "snapshot". A table of these hashes is, itself, recorded in one of the organisation's snapshots, probably on a server, in a folder reserved for all hash tables. A table ("Master Document Table"—MDT) is created for each audit period which consists of the hashes of all the hash tables in that folder. Finally, the hash of the table, known hereinafter as a Master Document Hash (MDH), is sent to a remote third party.

The data preferably comprises digital documents stored electronically, whether generated electronically or captured, for example by scanning a hard copy. The digital documents may, for example, comprise emails or the like transmitted between parties across an information technology network.

The first aspect of the present invention further extends to a method of storing and authenticating data, comprising the steps of storing copies of a plurality of data items, generating at the end of a predetermined period of time, a data file comprising hash values of each data item created and/or stored during that time, generating a single hash value of said data file, and transmitting said single hash value to a remote location for storage and/or publication thereof (or of data representative thereof).

The method of the first aspect of the present invention may include the steps of retrieving the stored copy of the data item, calculating the hash value (hashing) of the data item, comparing the hash obtained with its entry in the snapshot hash table; comparing the hash of that table with its entry in the Master Document Table for the period; checking that the hash of the MDT exists in the third party database; locating the third Party Master Document Hash (MDH) for the relevant table and, finally, assuming all hashes in the chain match to this point, obtaining the name of the relevant journals and publication dates from the third party, in order to check a copy of the relevant published journal and confirm that the relevant MDH matches the published version.

In accordance with a second aspect of the present invention, there is provided a system for transmitting data between first and second end users via an information technology communications network, said first end user encrypting a data item using a first identifier and transmitting the encrypted data item to the second end user, the second end user receiving the encrypted data item and transmitting an acknowledgement signal to the first end user, the first end user further comprising means for encrypting the first identifier using a second identifier and transmitting the encrypted first identifier to the second end user in response to receipt of the acknowledgement signal, the second end user further requesting and receiving the second identifier in response to receipt of the encrypted first identifier, decrypting the first identifier using the second identifier and decrypting the data item using the first identifier.

Also in accordance with the second aspect of the present invention, there is provided a method for transmitting data between first and second end users via an information technology communications network, comprising the steps of encrypting by the first end user a data item using a first identifier, and transmitting the encrypted data item to the second end user, the second end user receiving the encrypted data item and transmitting an acknowledgement signal to the first end user, the first end user encrypting the first identifier using a second identifier and transmitting the encrypted first identifier to the second end user in response to receipt of the acknowledgement signal, the second end user requesting and receiving the second identifier in response to receipt of the encrypted first identifier, decrypting the first identifier using the second identifier and decrypting the data item using the first identifier.

Such a method according to this second aspect preferably comprises the steps of:

generating a first hash value for a selected one of the data items;

digitally signing and encrypting the first hash value with a secret identifier associated with the first user;

transmitting to a second user the encrypted first hash value;

receiving and storing the transmitted encrypted first hash value for audit purposes and generating a second hash value for the received encrypted first hash value;

encrypting the second hash value with a private identifier associated with a second user and a public identifier associated with the first user; and returning the encrypted second hash value to the first user.

In a preferred embodiment, the second identifier is stored remotely from said first and second end users, preferably by a third party. Beneficially, the second identifier is transmitted to the remote storage location together with a hash value of the encrypted first identifier, by the first end user. Beneficially, the transaction embodied by transmission of the second identifier to the remote storage location is time stamped. In a preferred embodiment, the second end user transmits a request for the second identifier to the remote storage location, the request being in the form of a hash value of the encrypted first identifier.

In a preferred embodiment of the invention, the data item is encrypted using a symmetric key and the first identifier or key is encrypted using an asymmetric key. The acknowledgement signal may comprise a hash value of the original data item.

Thus, in accordance with the second aspect of the invention, the identifier first or "Secret Key" is sent separately and only when a request for it is received which takes the form of the hash of the encrypted data item Message—thus proving the recipient has received the correct file. The secret key is then encrypted with a further secret key and further encrypted with the recipient public key and sent to the second user.

A copy of the second secret key is sent to the third party, together with a hash value of the second message (the encrypted secret key) which was sent to the recipient. The recipient must now request the second Key from the third party by submitting the hash of the second message. The third party logs all its transactions and protects it own audit trail, so we now know that the recipient has received the message, its secret key, and, unless it reports a fault immediately, that it also has the second key.

The software which controls the request for the second key is beneficially arranged to ensure that it continues requesting until it is received and will not permit further transactions until it is received. Nor can it decrypt the second Key until it has formally acknowledged the receipt of the key. The protocol also requires human agreement that any communication failures not corrected by the system must be reported immediately to the sender by the quickest communication channel available. In other words, failure to report a problem in receipt constitutes acceptance of the successful transmission and decryption of the message and any liabilities which flow from that. In accordance with a third aspect of the present invention, there is provided apparatus for verifying by a second end user the authenticity of use of an identifier by a first end user, the apparatus comprising means for identifying the communication of a data item encrypted using or otherwise including an identifier unique to said first end user from said first end user to said second end user across an information technology communications network, means for accessing, in response to such identification, storage means containing information relating to one or more valid recent events or transactions relating to said identifier which have occurred across said information technology communications network, means for obtaining confirmation from said first end user that at least one of said recent events or transactions is valid, and means for preventing further use of said identifier in the event that such confirmation is not received.

Also in accordance with the third aspect of the present invention, there is provided a computer implemented method for a second end user to verify the authenticity of use of an identifier by a first end user, the method comprising the steps of identifying the communication of a data item encrypted using or otherwise including an identifier unique to the first end user from the first end user to the second end user across an information technology communications network, accessing, in response to such identification, storage means containing information relating to one or more valid recent events or transactions relating to the identifier which have occurred across said information technology communications network, obtaining confirmation from said first end user that at least one of said recent events or transactions is valid, thereby preventing further use of said identifier in the event that such confirmation is not received.

Thus, "Strong Revocation" in accordance with a third aspect of the invention, is intended to speed up the discovery of compromised keys. It achieves this by logging key transactions through a third party. The third party answers each new call by insisting that each user of a registered key is forced to acknowledge the validity of the immediately preceding transaction with the third party. Only if the previous transaction is confirmed does the new transaction proceed.

This is achieved by keeping some token of the previous transaction which can serve as a reminder to the calling system. Specifically, in this context, the last hash sent by the caller is preferably kept. The third party returns the previous hash, the caller's software flashes up the last transmission to the third party and compares the incoming hash with the hash of that transmission. If it matches, it advises the user accordingly. It is then for the user to acknowledge that s/he also recognises that transaction as being the last valid communication to the third party. If either the software or the user do not confirm the validity of the transaction, the new transaction is blocked and the caller's public key revoked (at least within the domain of the third party—they may not have authority to revoke it globally).

BRIEF DESCRIPTION OF THE DRAWINGS

Embodiments of the various aspects of the present invention will now be described by way of examples only, and with reference to the accompanying drawings, in which.

DETAILED DESCRIPTION OF THE PREFERRED EMBODIMENTS

The following specific description refers specifically to the generation, sending, receipt and storage of e-mails or similar data communications across an information technology communications network. However, it will be appreciated by a person skilled in the art that at least some of the methods and protocols described herein can equally be applied to the handling of other types of data items. In general, the various aspects of the present invention are intended to enable the provision, for any given e-mail document or other data item, of an audit trail with further provision for substantial authentication and verification thereof.

Thus, the various aspects of the present invention are based on four main principles:
- the provision, protection and validation of audit trails relating to data generated by and communicated between nodes of a network;
- authentication of communicating parties;
- enforcement of proof of receipt of data communications; and
- the detection of compromised user identifiers.

The object of these principles is that, should a dispute arise over the substance of an authenticated e-mail or other data item, it would be possible to prove, with mathematical precision, the following features of the communication:
- the content of the message sent;
- the e-mail location to which the message was addressed;
- the fact that the message was despatched;
- the time and date of despatch;
- the fact that the message was received;
- the time and date it was received; and
- the fact that the content of the message had not been changed since it was sent.

It is also intended to make it possible to prove the identity of the sender and the identity of the recipient.

Thus, in order to satisfy, for example, various legal requirements and/or challenges, it may be necessary to ensure that every relevant step in an e-mail communication is forensically provable. Each protected e-mail would require its own verifiable audit trail and it must be verifiably impossible to amend that audit trail without detection. As such, the following information (at least) needs to be captured in such an audit trail:
- the identity of the sender;
- the content of the message sent;
- the address to which the message was sent;
- the date and time the message was sent; the date and time the message was received;
- the content of the received message; and
- the identity of the recipient.

Figure 1:
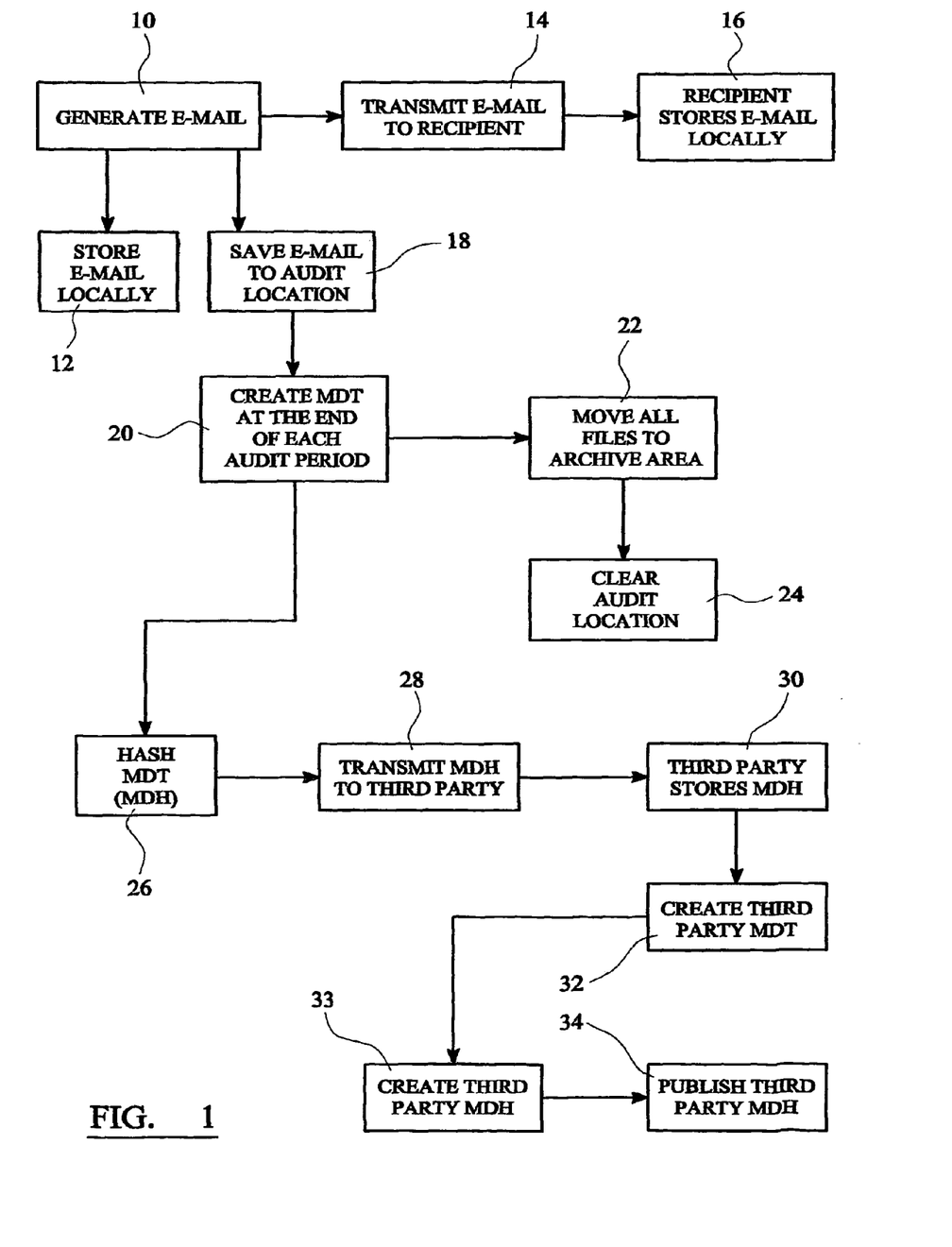
FIG. 1 is a flow diagram of a method according to a first exemplary embodiment of the present invention.

Referring to FIG. 1 of the drawings, a flow diagram of an exemplary embodiment of a method according to the first aspect of the present invention is illustrated.

At step 10, an e-mail message is generated and stored (at step 12) by the author/sender of the message. The e-mail message is then transmitted, at step 14, to the recipient across an information technology communications network, and the message may also be stored locally (at step 16) by the recipient.

It is well known to archive data files stored locally so as to provide a back-up to protect against disaster or theft. The most commonly used way of achieving such archiving is known as incremental archiving which begins with a complete backup of everything required to protect against disaster or theft, and thereafter involves creating a backup which only captures changes which have taken place since the previous backup. However, although this method of backup is routinely used by commercial organisations throughout the world, this type of backup does not provide a suitable audit trail for verifying the authenticity of documents, because it loses track of the date and time at which the data was created. One way of overcoming this problem is to take periodic "snapshots" of the data, which snapshots are, like the original backup, a complete copy of all of the protected data. This method enables the capture of new material at the point of its creation, but is hugely wasteful of time and storage space.

Thus, the data files in which the newly-generated e-mails are stored locally may either be regularly and sequentially archived or, more preferably, in accordance with this exemplary embodiment of the present invention, a new procedure is proposed for the creation of any files required to be subject of audit. The proposed method involves saving (at step 12) the content of the data item within the application in which it is created, and simultaneously saving the data item to an audit location (at step 18). It will be apparent that within any organisation, there will be a number of users all creating and changing documents and, as such, it is necessary for each data item saved to the audit location to include some form of identifier representative of the source of the new data.

At the end of each audit period, a new table is created (at step 20) which contains the following data:
- hash values of all files contained in the audit location,
- their filenames and/or absolute pathnames,
- their file size and
- time stamps.

This table is known as a "Master Document Table" (MDT). The MDT and all files in the audit location are permanently moved (at step 22) to an archive area and the audit location is cleared (at step 24) for the files in the next audit period.

The hash of the MDT is created (at step 26) and is known as the "Master Document Hash" (MDH). It is this hash which is sent (at step 28) to the third party.

There are three important features of the "one way hash" which provide substantial benefits to the present invention:
- Unlike other encryption techniques, it is not possible to reverse a hash to discover the original data. This makes it much easier to protect the data.
- The algorithms which may be used to create the hashes are freely available and usable from within standard web browsers and the like. This makes it much easier to enable remote users to authenticate data.
- Although it is mathematically conceivable that two different sources could produce an identical hash, the odds against this are $2^{160}$, which enables a considerable amount of confidence that, for the purposes of the present invention, the hash value of any document is unique.

Periodically, again typically daily, the third party will receive many data of this and related types. In a preferred embodiment, the third party will copy (at step 30) all such data received to CD ROMs (of the type which can only be written to once) before making such data available for public access. A new table will be created (at step 32) for each of these CD ROMs which stores the following information about each file on the CD.
File Hash
Filename
File source
File time-stamp
File size
CD ROM identifier
(optionally) authorised user who uploaded data.

This table is the third party's MDT. Its MDH (created by hashing the MDT at step 33) will be published (at step 34) in reputable journals.

To maximise integrity, the CD-ROM will be "closed" (which prevents further writing to it) even if it is not full; its MDT completed (and saved to another CD) and its MDH calculated and published at the end of each audit period-typically daily. If demand is sufficiently high to warrant multiple CDs within the audit period, each cd will have its own MDT and all relevant MDHs will be published. If demand regularly requires more than three CDs, the third party may switch to using DVD ROMs which are a similar technology but hold approximately four times as much data on a single disk. However, as DVD recording does not (to date) support multiple sessions, there may be security risks involved in holding uploaded data for several hours before DVD recording. It may also be undesirable to delay public access for as long as DVD recording may imply.

Figure 2A:
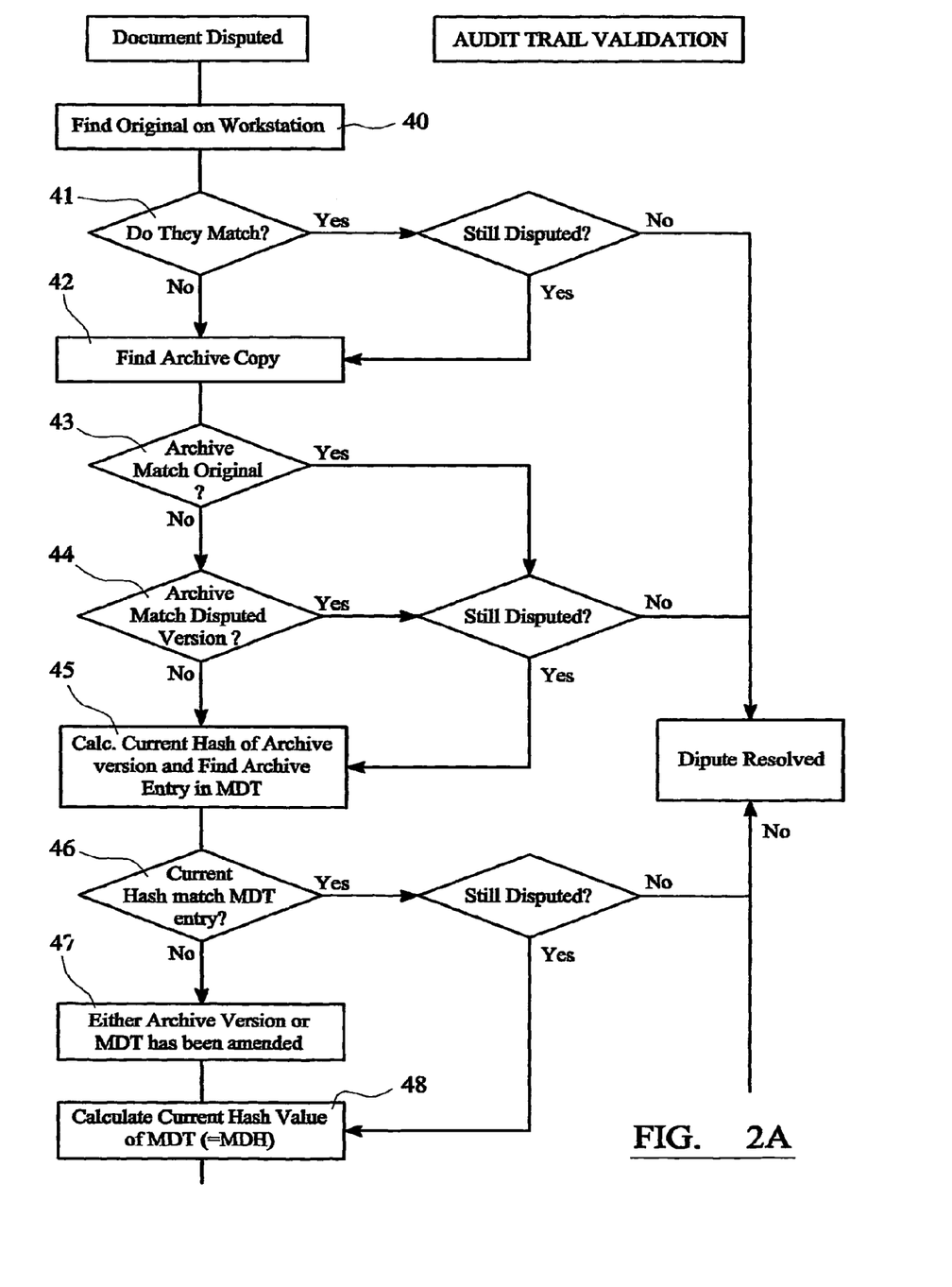
FIGS. 2A to 2B constitute a flow diagram of a method according to a second exemplary embodiment of the present invention.
Figure 2B:
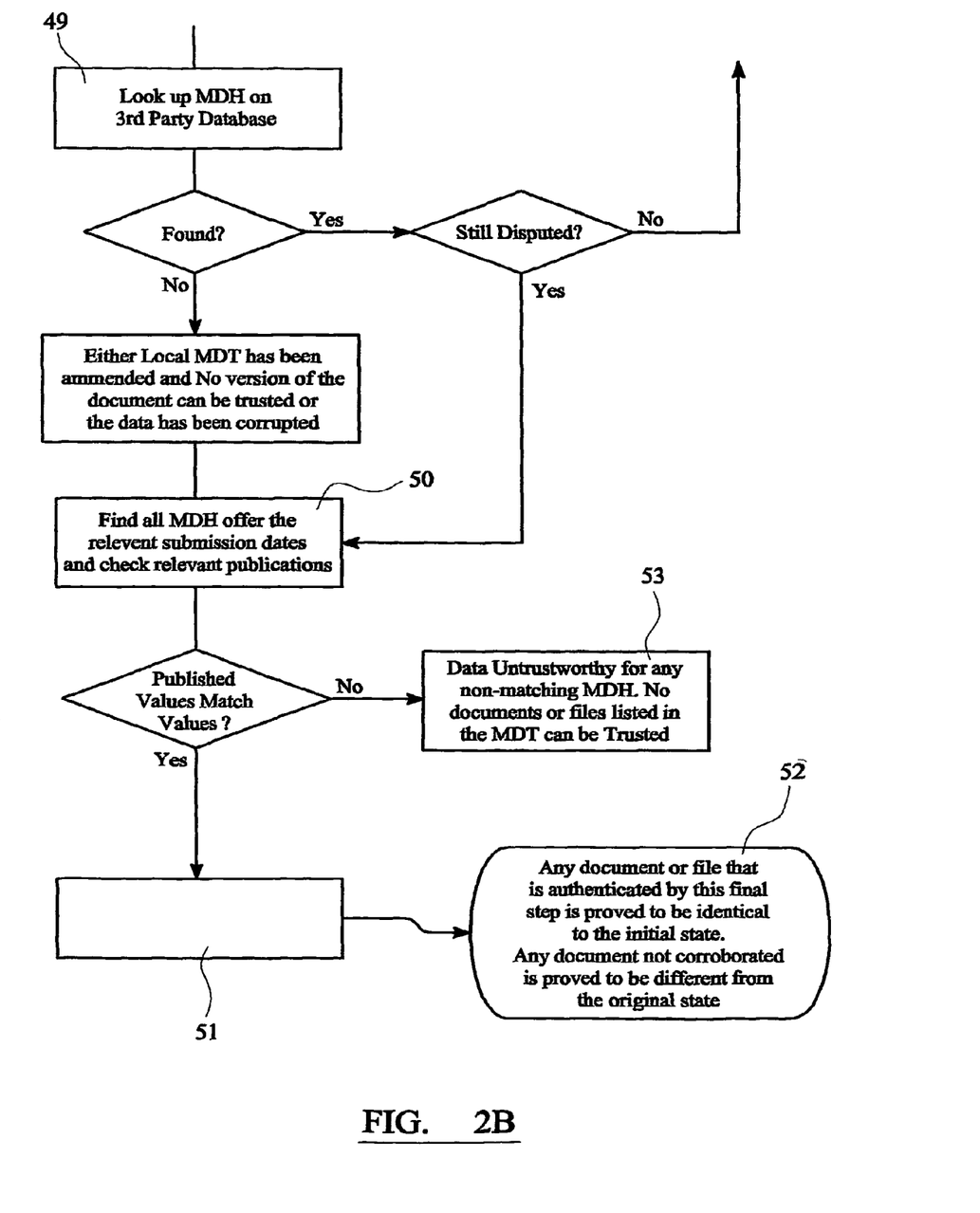

Thus, in accordance with the above-described protocol, in the event of a dispute, the audit trail created using the method described above can be used to confirm (or repudiate) any given e-mail as follows, and as illustrated by the flow diagram of FIG. 2:

The disputed document (which may comprise any digital document whether transmitted or otherwise) will be traced (40). Initially it will normally be found in the application dat space on the originating workstation. It will be compared with the disputed version (41). If there is no difference, then there is no dispute (as to content at least) and the matter rests (as far as audit trails are concerned).

However, if there is a difference, then the requirement is for the originator to prove that their version is as it was when first created and distributed. This process begins with a search in the organisations archive area for the relevant document (42). If it is found, the document is compared both with the originators version (43) and with the disputed version (44). If it matches the disputed version, that will suggest that the originator has amended the document since its initial distribution. If it matches the originators version, that will suggest that the disputant has amended their copy. In either case, we now need to prove the validity of the archive copy.

First we find its entry in the relevant MDT. We calculate its current hash value (45) and compare that to the hash value stored in the MDT (46). If they do not match, this suggests someone has amended either the MDT or the archived document (47). If they do match, then either the archived document and the MDT have remained unchanged (as they should), or both have been changed to ensure a match. In either case, we can only be sure of the original state of the MDT by calculating its hash (48). Even if we find it there, it suggests that no change has taken place, it is still possible that a sophisticated attacker could have infiltrated both the local organisation and amended the documents on its audit trail and the third party and created a suitably amended CD ROM. The only way we can prove this cannot have taken place is to check that the MDH of the third party CD ROM still matches the published version (50).

If it does, and the relevant journals are sufficiently numerous (typically millions of daily newspapers) then according to this aspect of the invention it is impossible for an attacker to have altered the published hash values to agree with the third party record, that is, the content of the document is proved and the audit trail is proved to be trustworthy (51). Any document or file that is authenticated by this final step is proved to be identical to the initial state. Any document not corroborated by this step is proved to be different to the initial state (52).

It is conceded that, if an attacker knows in advance, where an auditor is likely to perform their check of published journals, that it would be feasible for the attacker to alter the one or two copies of the journal necessary to fool the auditor. It is, therefore, important for the auditor to take steps to make their choice of check locations and journals as unpredictable as possible. Preferably, for example, the auditor would select more than a dozen widely separated public libraries at random in which to check the journals. If the published MDH does not match the third party MDH, the third party data is shown to be untrustworthy for any non-matching MDH. No documents or files listed in the relevant MDT can be trusted (53).

The second aspect of the present invention is concerned with the unequivocal proof of despatch and receipt of an e-mail between parties communicating across an information technology communications network, and their respective identities. The method described above provides an audit trail which can be used, independently by the sender to provide proof of despatch or by the receiver to provide proof of receipt. On its own, however, it is not capable of linking the two potential audit trails together. Specifically, it cannot be used to prove to the sender that an e-mail has been received and it does not, on its own, prove to the recipient who has sent the e-mail. Neither does the audit trail, as described above, prove the identity of the participants.

Although encryption may not be required for other purposes (i.e. the message may not be confidential), it does provide a very useful means, in accordance with the second aspect of the present invention, for proving receipt of data via an information technology communications network. It is useful to first consider generally the concept of the public key infrastructure, which may be used to encrypt (and, of course, decrypt) messages and/or digitally sign documents.

Public key or asymmetric encryption employs an algorithm using two different, but mathematically related, "keys", one for encrypting data and one for decrypting that data. The complementary keys of a public key (or PK) infrastructure are termed the private key and the public key. Thus, an entity that needs to authenticate its identity electronically or sign or encrypt data can employ the public key infrastructure and would have a public key and a private key associated therewith. Each public key may be published, or is at least fairly widely known, whereas the private key is kept secret. Data encrypted with the public key can be decrypted only with the private key, and conversely data encrypted with the private key can only be decrypted with the public key. Although this is obviously not a good way to keep messages secret, it is a good way to prove you are the owner of the private key. Anyone can decrypt it using the public key and it is accepted that any messages decrypted with the public key can only have been created by someone in possession of the private key. Hence private key encryption can be used as a basis for digital signatures.

Figure 3:
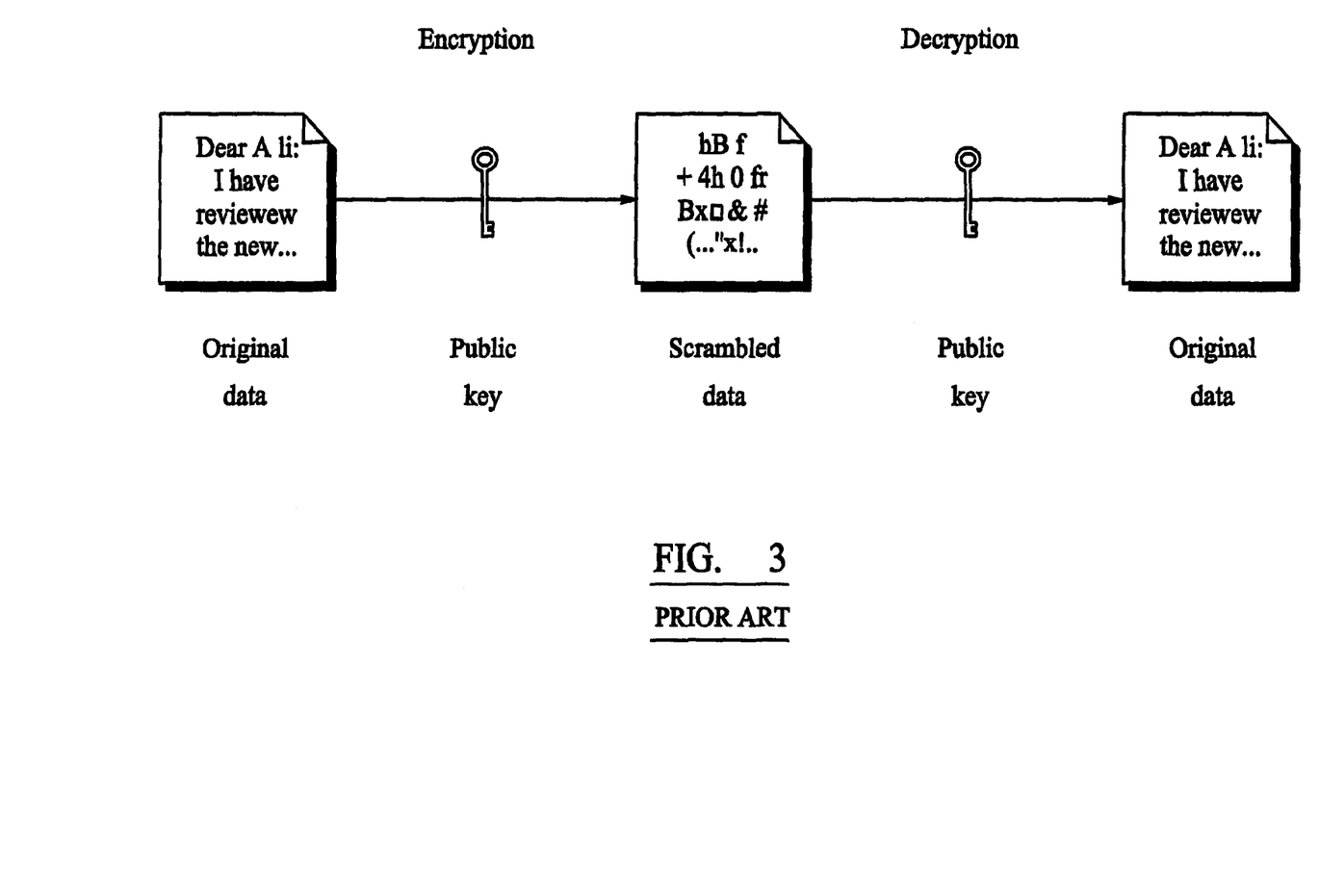
FIG. 3 is a schematic diagram illustrating the public key encryption method according to the prior art.

Thus, as shown in FIG. 3 of the drawings, a first user can encrypt data using the second users public key and transmit that encrypted data across an information technology communications network to the second user, safe in the knowledge that the data can only be decrypted and read by the second user's private key (which should only be available to the second user). As such, the second user can freely distribute their public key, knowing that only they (the holder of the corresponding private key) will be able to decrypt any data encrypted using that public key.

Another form of encryption is known as symmetric key encryption, which requires substantially less computation overhead than asymmetric encryption, and is therefore much more appropriate for large amounts of data. In the case of symmetric encryption, both parties to a communication share a secret key, which is used by the sender to encrypt a message and then again by the recipient to decrypt the message upon receipt. It is considered, at least potentially, to be the safest form of encryption.

One specific type of symmetric encryption, which can be proven mathematically to be completely secure, is known as the "One Time Pad" in which one character of Pad is used for each character of a message and then never used again. The One Time Pad is the ultimate symmetric key, but it also demonstrates a major weakness in connection with symmetric keys: the so-called "Key Distribution Problem", that is, how can the secret key for use in symmetric encryption/decryption be distributed safely in the first place? Obviously, if a secure channel is available for distribution of the key, then that channel may as well be used for transmission of the message without the need for encryption. In practice, therefore, the One Time Pad can only be considered to be completely secure if parties physically meet to exchange secret keys.

The use of public key (or asymmetric) encryption, as described above, solves the key distribution problem, but its processing overhead is a major disadvantage. Firstly, it takes considerably longer to encrypt or decrypt a message encoded with a lengthy public key than it does to encrypt the same message with even the strongest (i.e One Time Pad) symmetric key. Furthermore, relatively short symmetric keys have the same strength as much longer asymmetric keys. Thus, for example, if it is required to encrypt a message such that it could not be decrypted by an unauthorised user (simply using code cracking techniques) for at least the next 5 years, a 2048-bit long public (and corresponding private key) would be required, whereas the same level of protection can be achieved using a 160-bit symmetric key.

Nevertheless, the public key infrastructure is important because the private key can be used to sign data with your digital signature, which is an important requirement in the case of electronic commerce and other commercial applications of cryptography. The most useful and common form of a digital signature takes the form of a hash value of the message itself, encrypted using the sender's private key. The recipient decrypts the signature using the sender's public key. If the result matches the hash value of the decrypted message, the recipient has proved both the source of the message (the sender) and that the message has not been altered since the signature was applied.

For these reasons, the most common means of using PK cryptography has this form.
  Create Message
  Create Digital Signature
    Hash the Message
    Encrypt the Hash with sender's Private Key
  Create or obtain secret key Encrypt Message with secret key
  Encrypt secret key with Recipient's Public Key
  Send "Package" containing
    PK encrypted secret key
    Secret Key Encrypted Message
    Digital Signature of Hash of Message.

However, in accordance with the second aspect of the present invention, the Secret Key is not sent with the Message and Digital Signature. It is only sent in response to a digitally signed request from the recipient which takes the form of a hash of the encrypted Message. As only someone with that encrypted message could produce the matching hash, the request provides unequivocal evidence that the recipient has received the correct encrypted message. The digital signature confirms the source of the request as being the intended recipient.

Figure 4A:
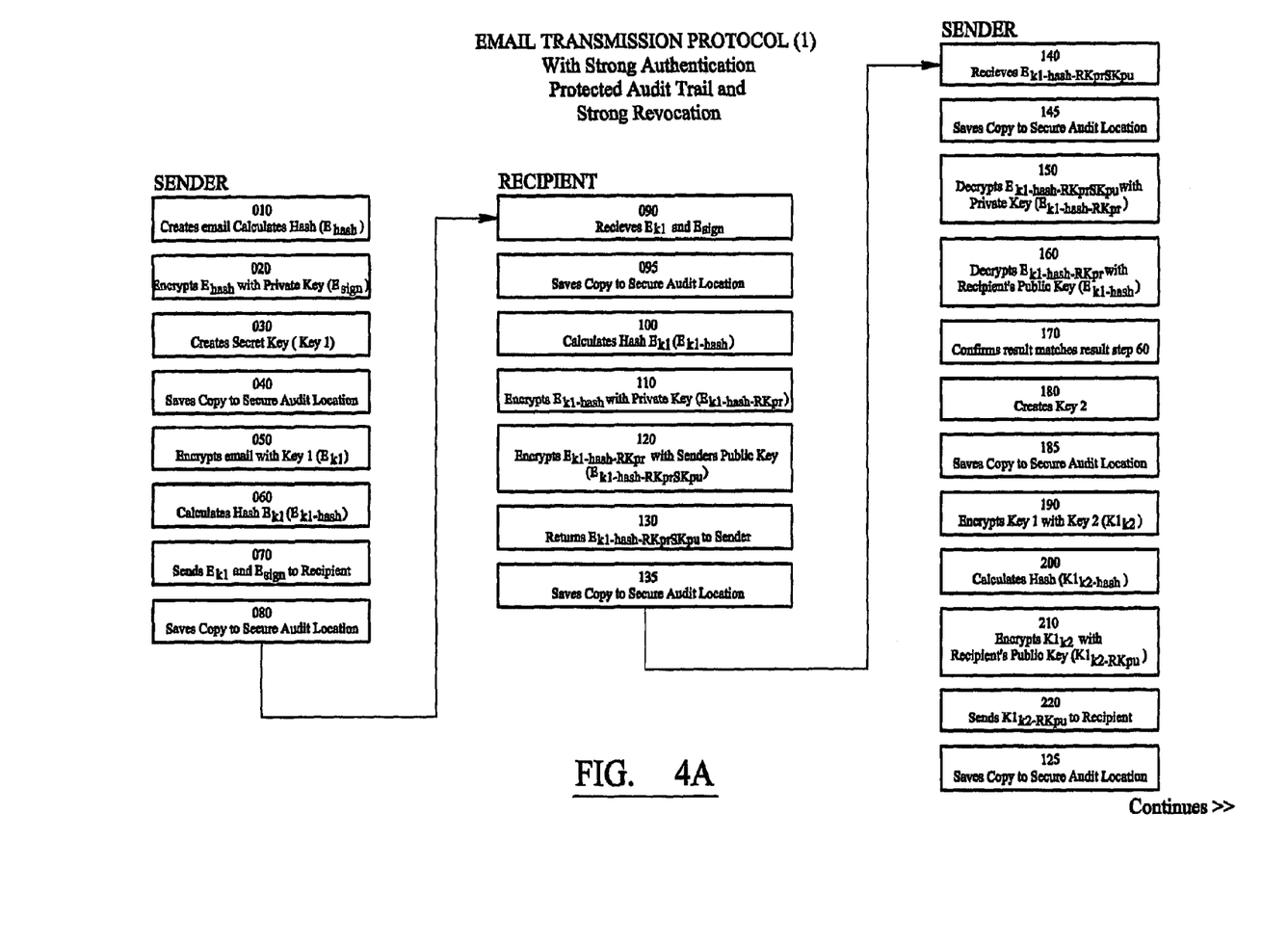
FIGS. 4A to 4E constitute a flow diagram of a method according to an exemplary embodiment of the present invention.
Figure 4B:
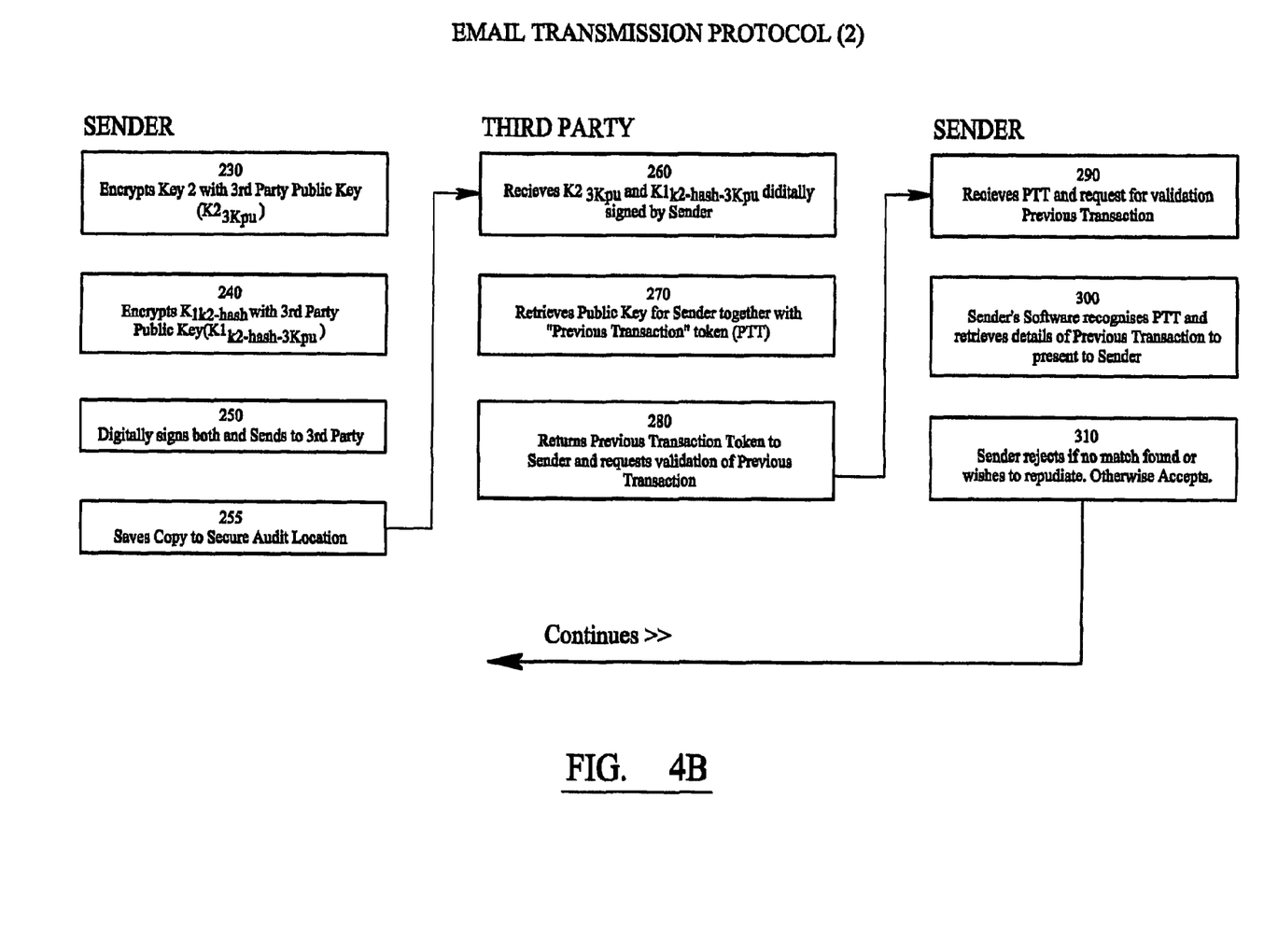
Figure 4C:
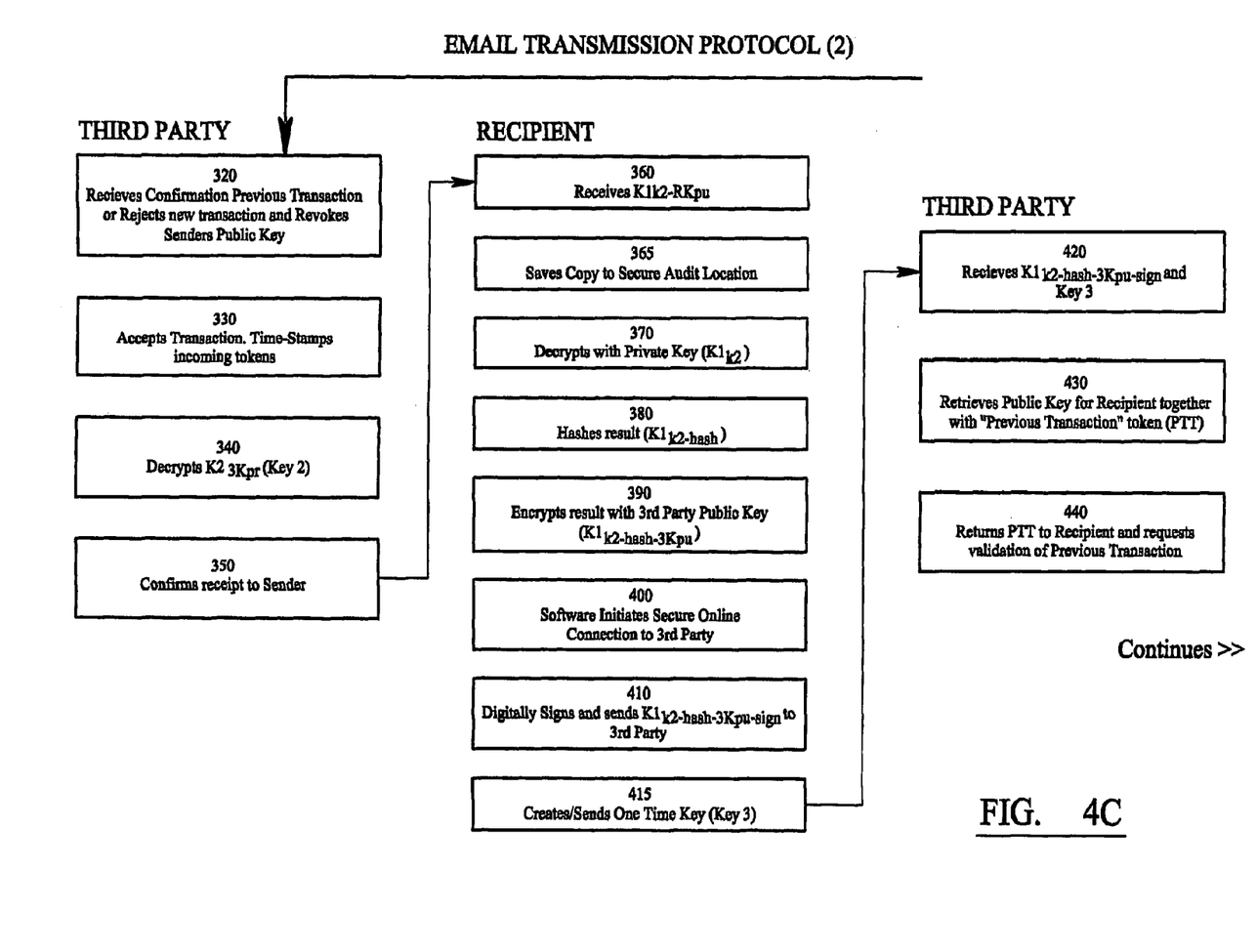
Figure 4D:
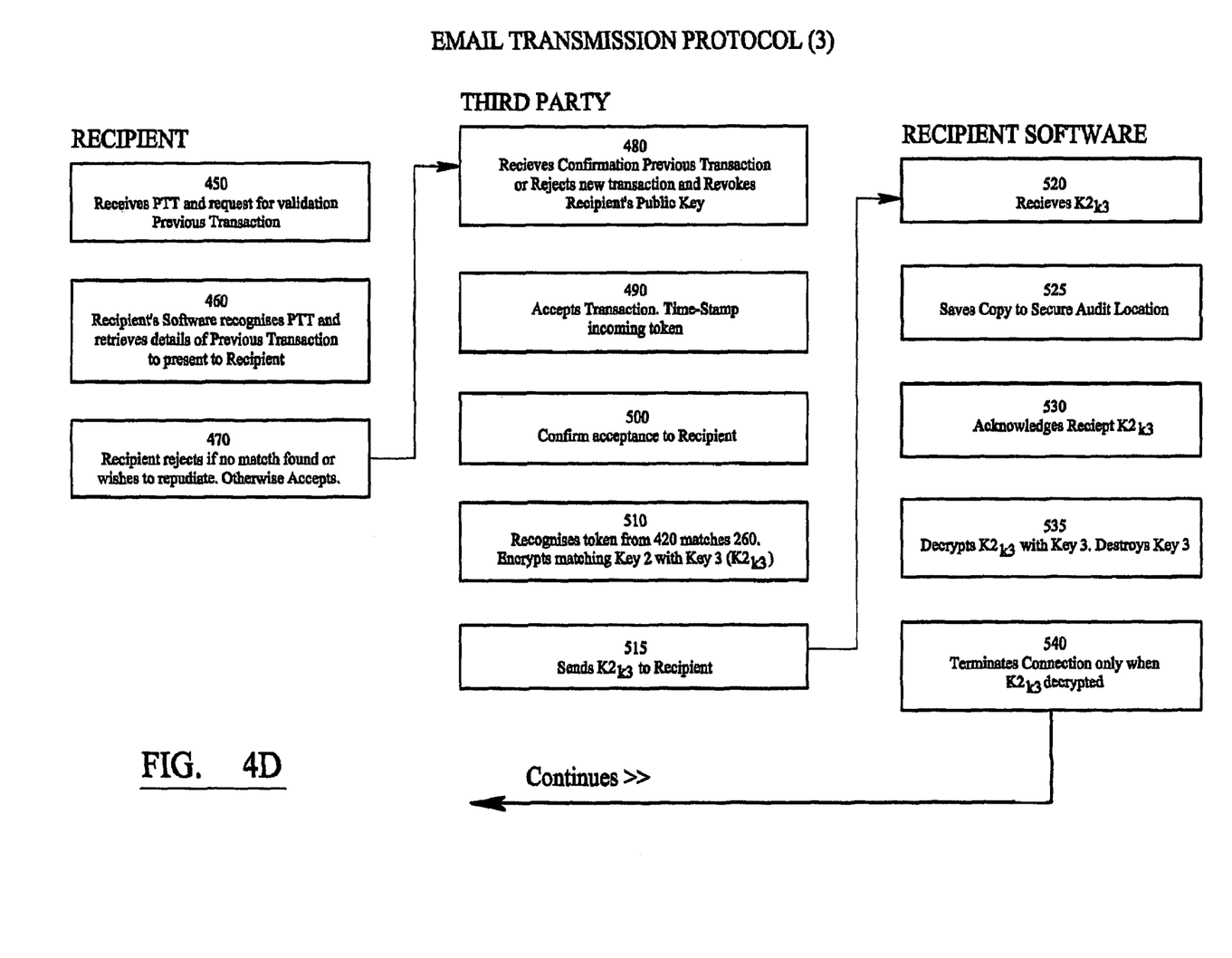
Figure 4E:
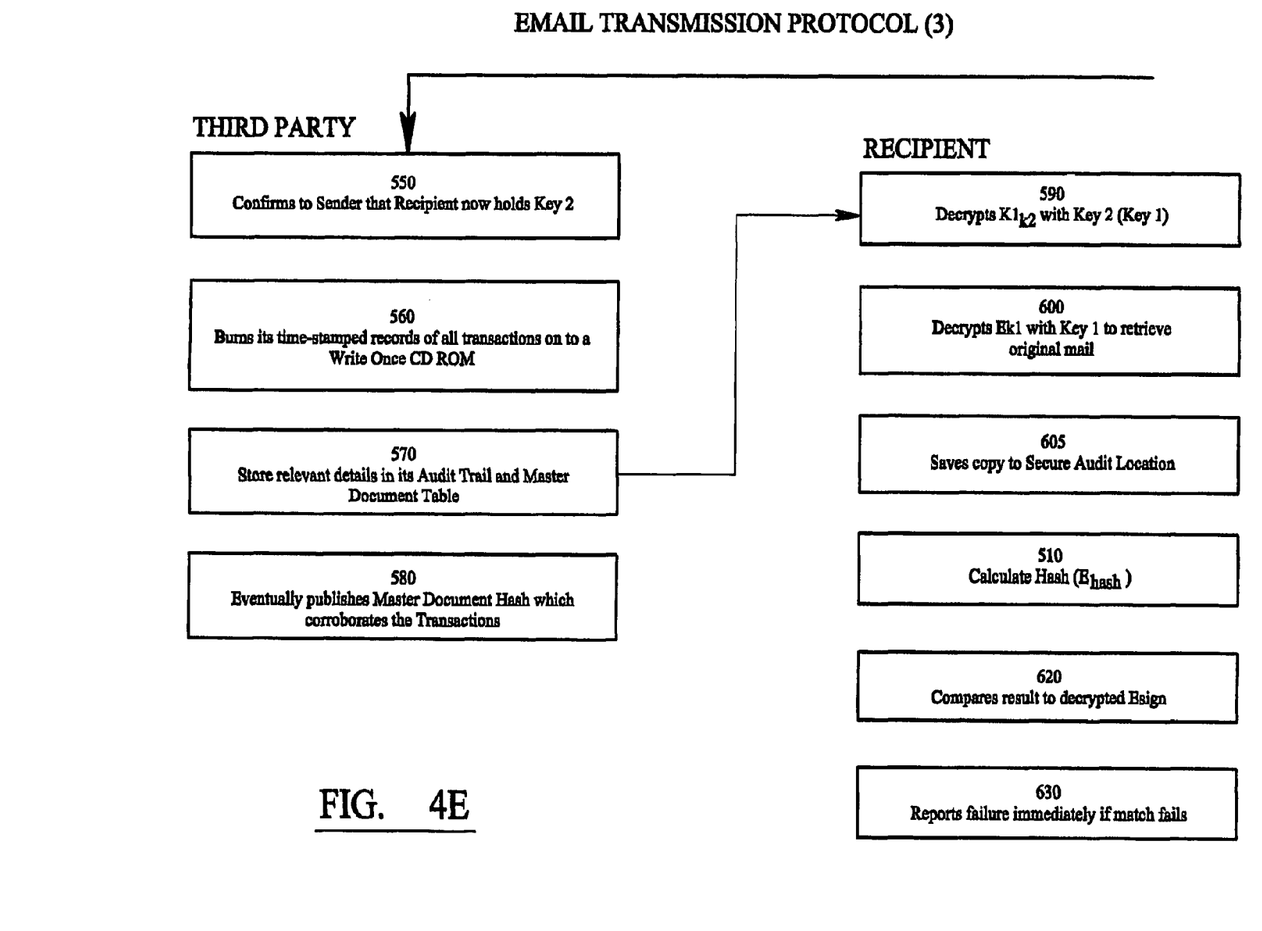

Thus, referring to FIGS. 4A to 4E of the drawings and particularly FIGS. 4A and 4B in the method of an exemplary embodiment of the invention, a sender creates an e-mail and stores its hash value at step 010. The sender then encrypts the hash of the message with their Private Key (digitally signs) (at step 020) and encrypts the actual message with a secret key (Key 1) (step 050) and transmits the encrypted message and signature but not the Key, to the recipient (at step 070). In order to obtain Key 1, the recipient, must generate the hash value of the received encrypted message (step 100) and transmit this hash, digitally signed, back to the sender.

The sender now has unequivocal evidence that the recipient has received the encrypted message. In response to receiving the relevant hash, the sender encrypts Key 1 with another Key (Key 2). This is digitally signed and further encrypted with the Recipients Public Key before transmission to the recipient.

The purpose of Key 2 is to establish a transaction through the third party in such a way that neither the message nor the secret key need to go through that third party (thus eliminating issues of Trust) but that the message cannot be read without a vital corroborating transaction being logged by the third party.

When the sender creates Key 2, they digitally sign it and send it to the third party together with the hash of the encrypted Key 1 they have already sent to the recipient (steps 230-250). The third party time-stamps the incoming Key 2 and stores the transaction as part of its audit trail, protected as above. The recipient received the encrypted Key 1, decrypts it PK wrapper with their own private key, hashes the result, digitally signs it and sends that to the third party as a request for Key 2. The third party logs that transaction in the same way as above and returns the requested Key 2. The third party also informs the sender that Key 2 has been sent.

The next issue is proof of receipt of Key 2. This is dealt with as follows. First, Key 2 is relatively short (no more than 32 bytes-256 bits). Second, the procedure at the recipient end is automated by the software written for this purpose which
  Recognises the incoming Key 1 message (from standardised content in the header) will not permit the Key to be downloaded unless the recipient gives the software permission to remain on line while it carries out the steps above
  Removes the PK wrapper
  Hashes result
  Digitally signs it
  Sends it to third party as request for Key 2
  Creates and sends a one time pad for use by the third Party in returning Key 2
  And will not attempt to decrypt the Key 2 package or conclude its end of the requesting transaction until a digitally signed (by third party) Key 2 has been received And receipted by the software.

The software request for permission takes the form of a reminder of the significance of the incoming Key 1, the procedures about to be carried out, if the recipient agrees, and that the recipient is obliged to report any unanticipated failures to download either Key 1 or Key 2 to the sender with an (agreed) time frame of, say 1-24 hours. The recipient is reminded that their endorsement of the Previous Transaction with the third party is required before the new transaction can proceed and that their agreement will be signified by their digitally signed request for Key 2 which transaction will be logged by the third party. Finally, the recipient is required to indicate their agreement (or rejection) by entering a random 4 digit code generated by the software on each such occasion. This ensures that the recipient cannot agree without conscious understanding and participation.

In the absence of a failure report from the recipient, the system can now demonstrate, beyond reasonable doubt, that
  An encrypted message and relevant keys have been sent by the sender or, more precisely, by someone who has access to the sender's private key
  The same message and keys have been received by the recipient (or someone who has access to the recipient's private key)

The final aspect of the invention deals with the issue of precise identity of sender and recipient. This remains a more difficult problem that either proving the audit trail or the despatch and receipt of messages. Final proof of precise identity is not possible without auditable biometric data. This invention does not solve that problem. It does, however, claim to reduce the probability of identity theft to the extent that a court would be able to accept that the balance of probabilities is such that the identity of communicating parties would be established beyond reasonable doubt.

In order to provide some form of certainty to others that an authorised signatory does in fact correspond to the identity of a particular person, one or more trusted third parties are used to associate an identified signer with a specific public key. Such a trusted third party is often termed a "certification authority". To associate a key pair with a prospective signer, a certification authority (such as a bank, post office, commercial body, etc.) issues a certificate which is an electronic record listing a public key as the "subject" of the certificate and confirming that the prospective signer identified in the certificate holds the private key.

However, this process relies on the fact that the digital certificate and the associated key pair have not been compromised. For example, the digital certificate may have been validly issued to an authorised signatory initially, but the private key may since then have been compromised in some way. There is no provision for up-to-date verification in the sense that the Certification Authority (CA) who accepted or set up the identifier or key and who vouch for the validity of that identifier to a third party have no way of knowing whether or when an identifier or key has been compromised. The onus is all on the key holder to keep track of the identifier and alert the CA as soon as a compromise is discovered; at which point the identifier is immediately revoked and a new identifier issued.

Credit cards and the like are subject to the same control and weaknesses. The problem is exacerbated with credit cards because their use has never been conducted particularly securely and many entities tend to have copies of a person's credit card data. In addition, there are many circumstances in which all a potential fraudster may require to purchase goods and services is the card holder's name, and the card number. As the cardholder still has the credit card in their possession, they may be completely unaware that the card data is being abused until a statement is issued (perhaps several weeks later) with one or more unexplained charges.

The method according to an exemplary embodiment of the third aspect of the present invention achieves a much greater level of security and enables the identity of communicating parties to be established and/or confirmed (or denied) reliably in real time. This is achieved by the combination of two protocols, which will herein after be referred to as 'Strong Authentication' and 'Strong Revocation'.

The terms "authentication" and "strong authentication" are well known in many different fields and situations. Indeed, traditionally there have always been at least three ways to "authenticate" people. The first way is to identify who they are, i.e. by verifying some unique biometric feature, we recognise a person. This is, in fact, a relatively secure method of authentication during ordinary day-to-day life. However, when parties are communicating via an information technology network, such as the Internet, they may be communicating with parties they do not know and could not recognise in this manner even if they had the opportunity to do so, and, in any event, it has (to date) been technically difficult to allow the parties to see or hear the party with whom they are communicating sufficiently well to allow such simple and effective biometrics to be used.

Thus, if biometrics are to be used for authentication of parties communicating via an information technology communications network (or indeed in any situation involving communication between strangers), it must be on the basis of submission of the necessary biometric data to some form of non-human or automated check, which all interested parties agree to trust. This poses a much greater problem than it may appear at first glance.

If such automated authentication is remote, the following questions arise:
  can we be certain that the biometric data actually originates from the party it belongs to (or could it have been captured electronically from an earlier session, for example, and fed into the system)?
  can we be certain that the person to whom the biometric data belongs is conscious or even alive? Fingerprints, for example, work just as well if taken from an unconscious or dead person. Even system which actually check for a "live" finger have been known to be compromised.
  can we be certain that the person to whom the biometric data belongs is not being forced to provide the data against their will?
  what are the risks of false positive and false negative identification?

These issues give rise to particular problems with biometrics as it is often difficult to obtain a consistent biometric reading. Human beings have an innate ability to recognise, for example, faces under a huge number of visibility conditions and from almost any angle and, although automated systems have been developed which can emulate this ability to a certain degree, they are by no means as powerful as the human recognition ability.

It will be appreciated that many of the above problems are primarily associated with the issue of remote authentication.

A second way to authenticate a person is by what they have in their possession. For example, a known method of remote authentication is achieved by means of a smart card, which cannot allegedly be forged or otherwise compromised. However, as in the case of recognition using biometric data, a number of questions still arise:
  can we be sure that the smart card signals or responses are coming from the card itself, and not a forged copy?

can we be sure that the smart card is, in fact in the possession of the correct person?

can we be sure that the card holder is not being forced to use the card under duress?

False positives and false negatives are less of a problem with such a digital system than with a system employing biometric data, because there is no need for interpretation with digital data: the response is either correct or incorrect. Nevertheless, although false positives should be very rare, false negatives can arise from damage to or malfunction of the card and, if this occurs at the wrong time, the results can be disastrous.

A third way to identify a person is by what they know. Personal Identification Numbers (PIN's) and passwords are a familiar example of information a person may be required to provide in order to authenticate their alleged identity. PIN's tend to be limited to 4 numbers, which allows only 10,000 possible combinations, so that the task of identifying the correct PIN number is a trivial computing matter, especially in the case of a system which permits unlimited attempts. Passwords, as such, are not necessarily insecure. However, a problem arises because many people have difficulty in remembering long, complicated passwords, and tend instead to select children's names, phone numbers, vehicle registration numbers, and other names and numbers which are easily guessed.

Thus, none of the above-described methods provide a foolproof way to authenticate a remote party. The term 'Strong Authentication' is applied to methods which employ two or more of the above methods simultaneously. For example, such a method may require the provision of a smart card and a password (and perhaps even a session PIN), using the logic that a stolen card cannot be used by anyone who does not know the password/PIN, and vice versa.

Another example of Strong Authentication is the PKI protocol described above. This infrastructure is in common use and is widely trusted. It works on the basis that only the legitimate owner of a Private Key is supposed to have access to it for the purpose of sending messages or signing them. As with the proof of receipt protocol described above in the context of the present invention, the purpose of PK encryption is not so much to maintain secrecy, although this is considered to be a useful additional benefit. Instead, the main point behind the use of PK encryption is that the holder of the private key has a vested interest in safeguarding their key and ensuring that only they can access the key. There is also a well-established infrastructure for managing the keys and certificates (as described above) which maintain Trust in the PK system. However, there is one perceived weakness in the conventional PK system, which is the ability to repudiate transactions at a later date by claiming that the private key must have been compromised.

If, therefore, it were possible to show that the communications could only have been effected between the holders of relevant private keys, then we can legitimately assume that the holders of those private keys are indeed parties to the (disputed) transaction; with one proviso: that a compromised key is identified and revoked as soon as possible. This is the basis of the above-mentioned weakness of the PK system, in the sense that the compromise may not be detected for a considerable period of time, during which the private key may be used illegitimately, and following the discovery of such compromise, the legitimate owner of the key may (if they wish) revoke their key and repudiate any number of past transactions claiming that their key was compromised many months previously.

Briefly, the proposed Strong Revocation Protocol requires participants using any Private Secret Identifiers (smart cards, PK, credit cards etc) for any purpose to verify the immediately prior use of that Identifier (in the relevant domain, which may be global). The protocol can take two forms: with or without a trusted third party. Without a trusted third party, the protocol would require verification of the immediately prior transaction between the two parties only. Failure may only be implications for transactions between those two parties (although either party may, of course, choose to inform the relevant Certification Authority). With a trusted third party the protocol would require verification of the immediately prior transaction logged by the third party and that third party would confirm to each communicating party that their respective credentials had not been revoked. Such a third party is likely to be a CA itself and is thus likely to revoke any failed credentials, globally, immediately upon failure.

Explicit acceptance of previous transactions builds trust in the audit trail associated with that key. Should a dispute arise, say 30 transactions later than the disputed transaction, the card or key holder, if they wished to repudiate the disputed communication, would also have to repudiate the 30 subsequent communications which have been explicitly confirmed up until that point in time. The strength or weakness of any such repudiation would then come down to the number and nature of the subsequent transactions.

From this, it can be seen that the only way to repudiate a transaction prior to the last transaction is to repudiate all transactions back to the disputed transaction. This will, of course, be justified in some cases, where a card or key has been systematically abused for a period of time before the compromise comes to light. However, it would substantially reduce or eliminate the occurrence of illicit repudiation of older transactions.

Thus, going back to the exemplary method of the second aspect of the present invention (described above with reference to FIG. 4 of the drawings), the third party from whom key 2 is requested by the recipient of a message (at step 76 in FIG. 4) maintains a record of each time key 2 is requested and by whom. In the Strong Revocation Protocol according to an exemplary embodiment of the third aspect of the present invention, the third party, in response to receipt of a request for key 2, identifies the requestor's public key (at step 90), using the record of public keys it maintains. Once the identity of the requestor is determined, the third party identifies (at step 91) the last transaction in which the identified requestor public key was involved and transmits a message (at step 92) to the requestor asking that person to confirm or deny the identified last transaction using key 2 in which they were involved. Thus, a message along the lines of "You last used this key at 4.24 pm on Tuesday 3 May 2002. The hash of the relevant encrypted e-mail is attached. Do you wish to check and confirm that prior use?"

Saying "No" immediately repudiates the previous transaction (and possibly a number before that) and immediately revokes the requestor's public key (step 93) at least with respect to its acceptance by the third party. If the requestor, responds positively, the third party may check the hash of the previous message against the requestor's own stored records (at step 94). If they match, the current transaction is allowed to proceed and key 2 is transmitted to the requestor (at step 95). If however, no match is identified, the requestor is informed (at step 96) and/or the third party may automatically terminate the current transaction, repudiate the previous transaction (and possibly a number before that) and immediately revoke the requestor's public key (step 93).

Thus, with this (and with the credit card scenario and the like), if anyone wants to repudiate a transaction many weeks old, they can only do so by repudiating all transactions since (which, after all, began by accepting the previous transactions). To an organisation which routinely sends out hundreds of e-mails per day or per week, for example, the above-described method provides considerable additional trust to all transactions.

Thus, a third party employing a combination of the first, second and third aspects of the present invention results in a system which provides:
- a constant on-line source to for key 2;
- a point at which the or each transaction can be publicly logged;
- a point at which a previous transaction can be explicitly confirmed for the purpose of Strong Revocation; and
- the final level of validation of any audit trail through its printed MDH's.

An exemplary method combining the first, second and third aspects of the present invention, in order to ensure unequivocal evidence of the transmission and receipt of an electronic mail document is illustrated by the flow diagrams of FIGS. 4A to 4E. The bulleted numbers below match the Step numbers in the flow diagram.

What is claimed is:

1. A computer implemented method of transmitting data between a first user and a second user via an information technology communications network, the computer implemented method comprising the steps of:
   generating a first hash value for a selected data item;
   digitally signing and encrypting said first hash value with a secret identifier associated with the first user;
   transmitting to a second user said encrypted first hash value;
   receiving and storing said transmitted encrypted first hash value for audit purposes and generating a second hash value for said received encrypted first hash value;
   encrypting the second hash value with a private identifier associated with a second user and a public identifier associated with the first user;
   returning the encrypted second hash value to be received by the first user;
   decrypting said received encrypted second hash value with the private identifier associated with said second user and the public identifier associated with said first user to derive a further hash value therefrom;
   comparing the further hash value with the second hash value generated for said received encrypted first hash value to confirm digital identity of the second user;
   and in response to the comparing of the further hash value to confirm digital identity of the second user, encrypting the secret identifier associated with the first user and transmitting to the second user the encrypted secret identifier associated with the first user for decryption and subsequent use in decrypting said encrypted first hash value, wherein the steps of the computer implemented method are performed by at least one computer.

2. A computer implemented method according to claim 1, wherein:
   the encrypted first hash value is stored remotely from said first and second end users by a third party.

3. A computer implemented method according to claim 1 wherein:
   the secret identifier is encrypted with a key that is obtained through transactions between said second user and a third party.

4. A computer implemented method of transmitting data between a first user and a second user via an information technology communications network, comprising the steps of:
   generating a first hash value for a selected data item;
   digitally signing and encrypting said first hash value with a secret identifier associated with the first user;
   transmitting to a second user said encrypted first hash value;
   receiving and storing said transmitted encrypted first hash value for audit purposes and generating a second hash value for said received encrypted first hash value;
   encrypting the second hash value with a private identifier associated with a second user and a public identifier associated with the first user;
   returning the encrypted second hash value to be received by the first user;
   decrypting said received encrypted second hash value with the private identifier associated with said second user and the public identifier associated with said first user to derive a further hash value therefrom;
   comparing the further hash value with the second hash value generated for said received encrypted first hash value to confirm digital identity of the second user; and
   in response to a failure to confirm digital identity of the second user, denying the second user access to the encrypted first hash value by omission of transmitting to the second user the encrypted secret identifier associated with the first user, wherein the steps of the computer implemented method are performed by at least one computer.

5. A computer implemented method according to claim 4, wherein:
   the secret identifier is encrypted with a key that is obtained through transactions between said second user and a third party.

6. A computer implemented method according to claim 4, wherein:
   at least one of said transactions between said second user and said third party is recorded and time stamped by said third party.

7. A computer implemented method according to claim 4, wherein:
   the encrypted first hash value is stored remotely from said first and second end users, by a third party.

* * * * *